INVENTORS
WALTER A. MILLER
WILLIAM L. CALVERT
ATTORNEY

INVENTORS
WALTER A. MILLER
WILLIAM L. CALVERT

ATTORNEY

Sept. 11, 1962  W. A. MILLER ET AL  3,053,079
VISCOSIMETER
Filed Oct. 13, 1958  4 Sheets-Sheet 3

INVENTORS
WALTER A. MILLER
WILLIAM L. CALVERT
BY
ATTORNEY

INVENTORS
WALTER A. MILLER
WILLIAM L. CALVERT

ATTORNEY

United States Patent Office 3,053,079
Patented Sept. 11, 1962

3,053,079
VISCOSIMETER
Walter A. Miller, Somerville, and William L. Calvert, Westfield, N.J., assignors to Union Carbide Corporation, a corporation of New York
Filed Oct. 13, 1958, Ser. No. 767,006
3 Claims. (Cl. 73—60)

This invention relates to an apparatus for controlling the viscosity of a thermoplastic resin. More particularly it relates to a novel rotational viscosimeter structure.

According to the invention there is provided a viscosimeter for automatically controlling the pyrolysis of a thermoplastic resin. The method of using the viscosimeter comprises passing the pyrolyzed resin through a constant speed rotational viscosimeter at a constant temperature, measuring the torque required to turn said viscosimeter, converting said torque measurement into a control signal, comparing said signal with a predetermined (set point) signal and controlling the temperature of the pyrolysis reaction in accordance with the difference in said signals.

There is an ever increasing need among both industrial and retail consumers for thermoplastic resins having precise physical characteristics. A great many of these thermoplastics are polymers having as-produced molecular weights which are too high in that they have many undesirable physical characteristics at these weights. It is accordingly the practice to pyrolyze the as-produced resin to obtain a resultant material having a lower and controlled molecular weight.

The heat for the pyrolysis of a resin may be supplied, for example, by heating elements as the material passes through a suitable vessel or in the form of friction as the material is worked in various well-known mills, such as a Marshall mill which comprises a series of rotating disks which work the plastic material. It has been found that the molecular weight of a given thermoplastic can be expressed as a function of its viscosity at a given elevated temperature. In other words the molecular weight is proportional to the viscosity at such temperature. This viscosity has been termed the melt viscosity and is commonly expressed as the melt index number for the given material at the given temperature. For a precise definition of melt index number, reference is made to the ASTM definitions of terms D–1238–52T.

In a typical commercial process for the production of a thermoplastic resin, polyethylene, for example, it has been the practice to periodically sample the resin in the product flow stream subsequent to the pyrolysis step and determine the melt viscosity or melt index as an indication of the molecular weight. As the figure is high or low the amount of heat supplied to the resin is increased or lowered manually to maintain a constant desired melt index. However, it has been found that such periodic sampling and control fall far short of desired levels since a few minutes of over or under pyrolysis can cause a large batch to be contaminated and rendered useless.

Industry has long sought an apparatus capable of automatically measuring melt viscosity and hence melt index and thereby developing some control for the pyrolysis steps of thermoplastic production.

It is accordingly an object of this invention to provide an apparatus for continuously controlling the degree of pyrolysis of thermoplastic resin.

It is a further object to provide such an apparatus wherein the melt viscosity is utilized as the control parameter.

It is a still further object to provide a novel rotational viscosimeter capable of accurately obtaining viscosity indications of such thermoplastic resins at elevated temperatures.

Other objects and advantages will be apparent from the accompanying description and drawings in which.

Figure 5:
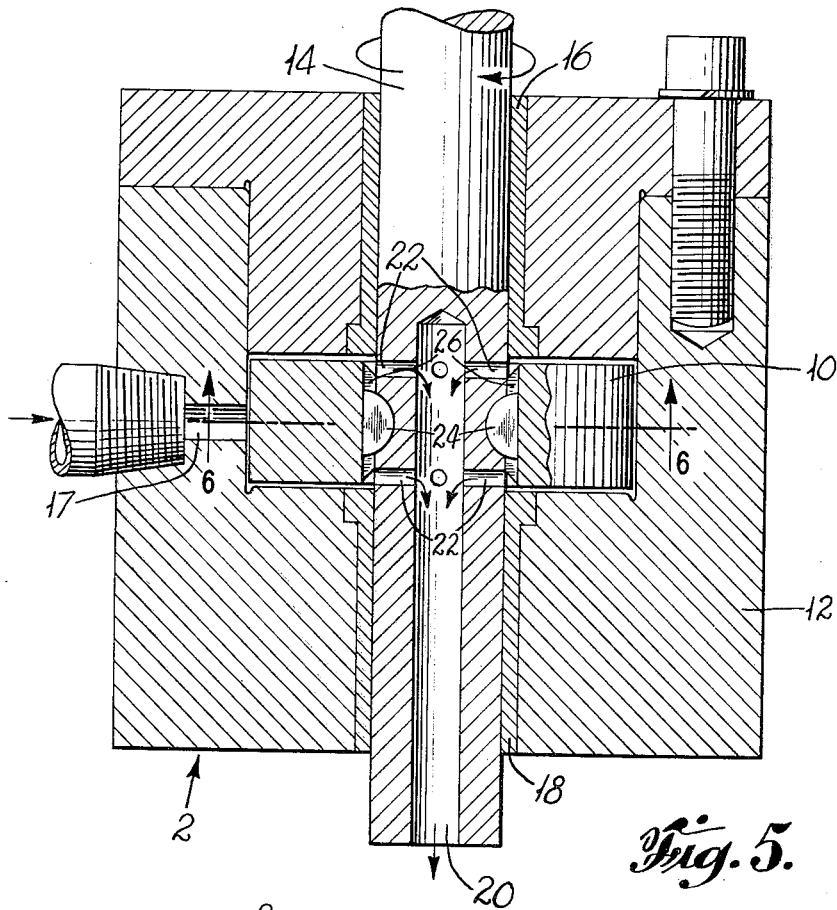
FIG. 5 is a view on an enlarged scale of a cross section of the viscosimeter taken in the plane of the axis of the drive shaft.
Figure 6:
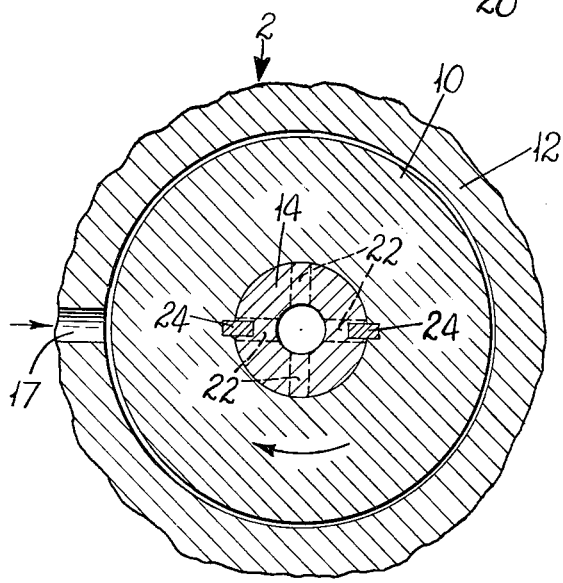
Figure 7:
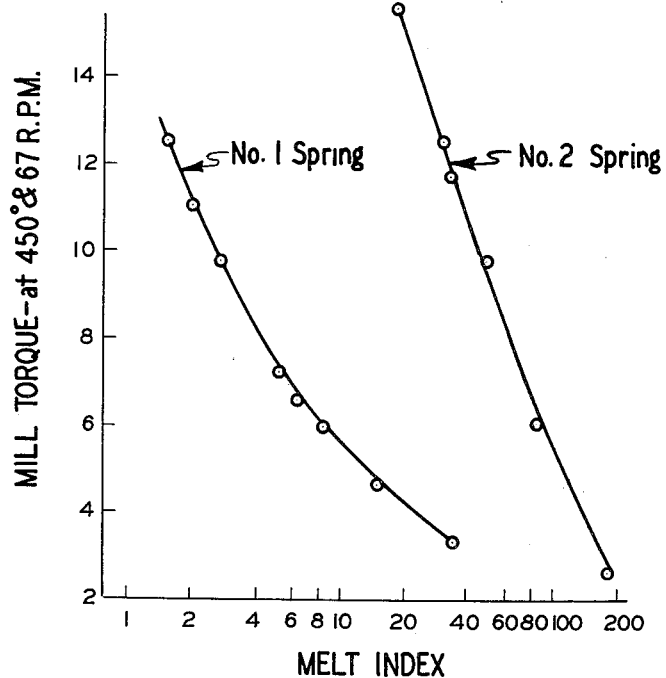
Figure 8:
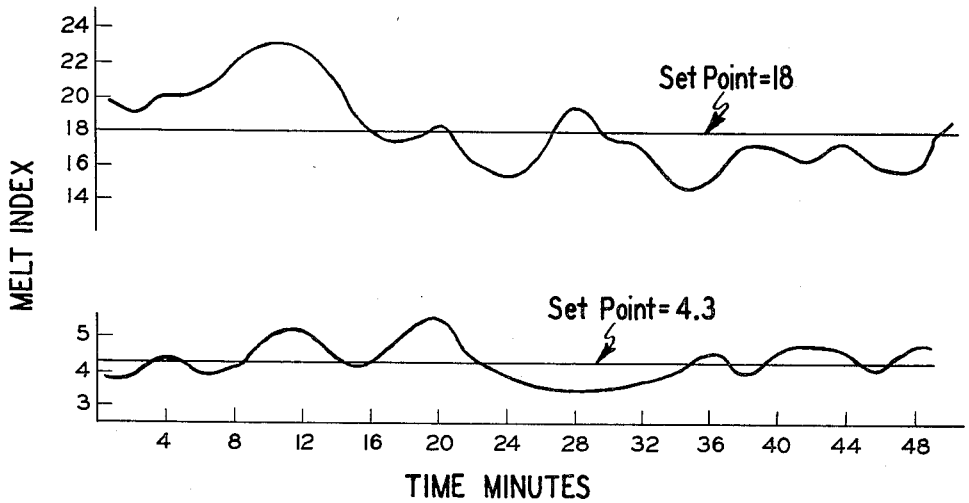

FIG. 6 is a fragmentary view of a cross section of the viscosimeter taken on line 6—6 of FIG. 5 and FIG. 7 shows a set of curves illustrating the ranges of melt index control available with two torque compression springs of differing stiffness; and FIG. 8 shows curves illustrating the resultant automatic control obtained about a melt index set point using two different torque compression springs in combination with the disclosed embodiment of the control system.

The improvements effected in this invention are an improved very efficient and sensitive viscosimeter and a system including means for measuring continuously the torque on the viscosimeter rotor which is a direct measurement of the melt viscosity of the extruded plastic stream passing through the viscosimeter and means for utilizing said torque signal to control the pyrolysis of the plastic stream to maintain the melt index at a relatively constant level.

Figure 1:
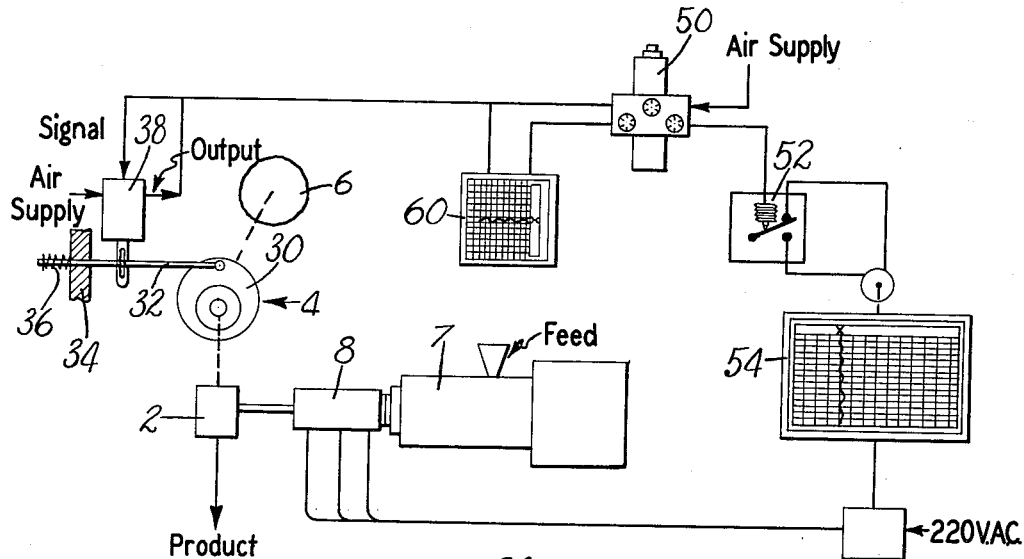
FIG. 1 is a block diagram of one embodiment of an assemblage of apparatus according to the instant invention used to monitor and control the pyrolysis of a thermoplastic resin.

The system comprises a rotational viscosimeter, a torque-measuring drive means, and a control system whereby pyrolysis temperature is controlled to maintain constant torque. Since, as stated above, melt index may be correlated with torque, the viscosimeter being operated at constant temperature, this equipment continuously measures and automatically controls the melt index of the pyrolyzed polyethylene stream. FIGURE 1 is a schematic representation of the system.

FIGURES 1 through 4 show both a schematic and the actual physical relationship of the various elements of one embodiment of the invention. FIGURES 5 and 6 show detailed cross-sections of one embodiment of the viscometer per se.

Referring more particularly to FIGS. 5 and 6 the viscosimeter itself consists of a 3" diameter x 1" thick disc 10 which rotates in a close-fitting housing 12. The shaft 14, which may be integral with the disc or keyed thereto as shown, extends both upward and downward out of the housing 12 through bronze bearings 16 and 18. The upper extension is the drive shaft; the lower extension is bored at 20 to serve as the discharge pipe; and axial hydraulic forces on the disc are balanced. Material enters the mill through the side of the housing 12 through an inlet 17 and impinges upon the periphery of the disc. Thence, as a thin film between the rotating disc and housing, it progresses across the upper and lower faces of the disc toward the axis, passes through ports 22 into the bored-out interior 20 of the shaft, and proceeds downward until it emerges from the bottom of the rotating shaft 14. A small amount of material bypasses the porting and passes out through the bearings, serving as a lubricant and after emerging is discarded. It is an important feature of the design that this bearing leakage material is isolated from the main stream and is discarded. The keys 24 located in arcuate slots in the shaft and the matching keyways 26 in the disc 10 are merely fabrication expedients. This keying of the disk to the shaft has the advantage that the disk can adjust itself with respect to the shaft so that the disk can space itself evenly in the chamber of the housing. The shaft and disc could readily be made in one piece whereby the ports 22 at the base of the disc 10 would proceed in a straight line to the bore 20 and intersect therewith at an angle, other than 90° as illustrated. The disk and shaft would then be free to center themselves as a unit.

The heart of the drive is a torque-arm reducer 4 belt-driven from a constant speed motor. It is mounted directly on an extension of the disc drive shaft. Essentially the torque-arm reducer comprises a planetary gear train within a case 30 whereby the case would be caused to rotate rather than the output shaft if the case were not restrained as would occur with any such gear train.

Figure 3:
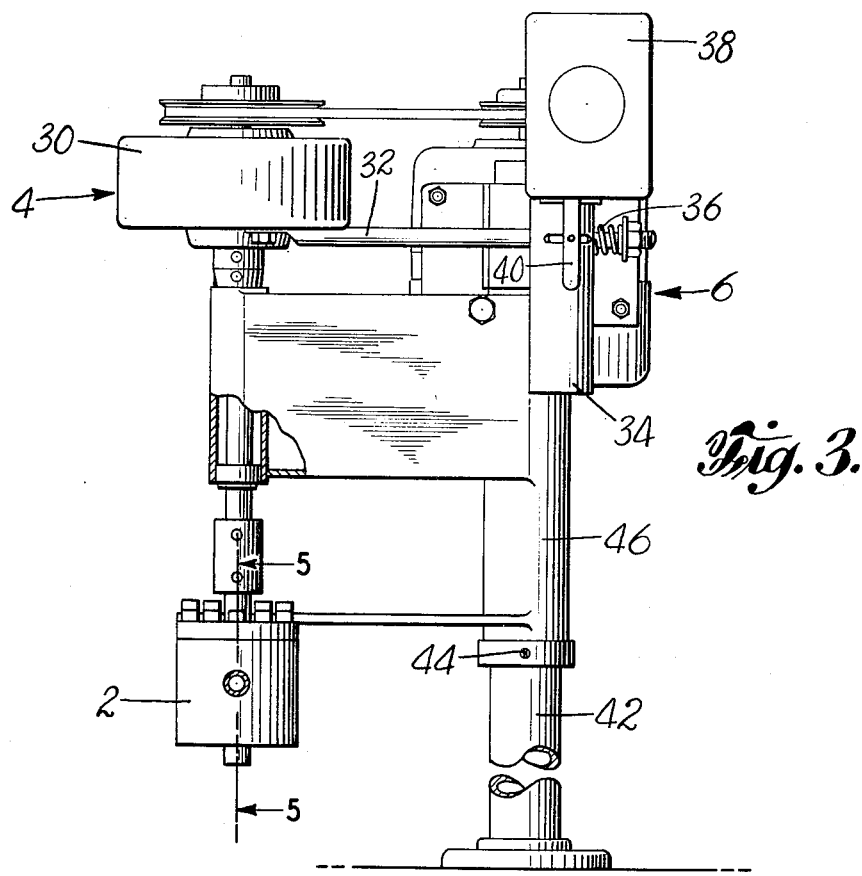
FIG. 3 is an elevational view of the viscosimeter showing the driving means and torque measuring means therefor.
Figure 4:
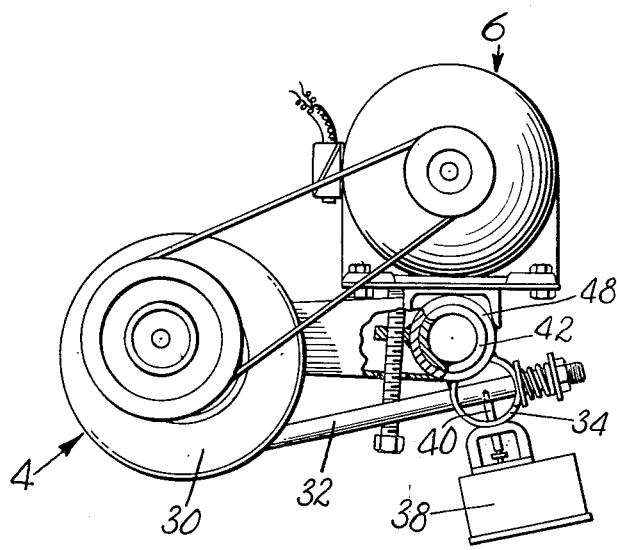
FIG. 4 is a top view of the equipment shown in FIG. 3.

The case is prevented from rotating by a link 32 (torque-arm) resiliently connected to a fixed point on the frame at a hollow member 34. Tension in this torque arm is proportional to the transmitted torque. In this apparatus, the torque arm pull is opposed by a compression spring 36, the degree of deflection of which provides an indication of torque. FIGS. 3 and 4 clearly show the mounting of the torque indicator arm 32 and the compression spring 36 the arm 32 being slideable thru a transverse hole in hollow member 34. Thus as torque increases the arm compresses the spring toward fixed member 34. A pneumatic displacement transmitter 38 (such as a Foxboro pneumatic valve positioner having its output air signal fed back to its input to convert arm displacement to a proportional air pressure signal) is mounted on the support frame 42 adjacent member 34 and has an operating arm 40 attached through a slot in the hollow member 34 to the torque arm 32 to translate the linear deflection of the compression spring 36 into a proportional output-air pressure signal. The displacement transmitter 38, thus translates spring deflection into a 0–15 p.s.i. air signal, which is connected to a torque indicating recorder 60 and a control device as described below.

The control system consists of a pneumatic control device 50 which compares the torque air signal with a predetermined set-point air signal and puts out a resultant air signal proportional to the error. This signal in turn actuates a pressure switch 52 (double-throw) which causes the temperature set point on a Leeds & Northrup Micromax recorder-controller 54 to be driven up-scale or down-scale at a controlled rate. The controller both records and controls the temperature of the pyrolysis tube 8. This entire system is merely representative of a control system within the scope of the invention and was constructed of available units. It is described here only as representative of one embodiment of the invention. The temperature of the viscosimeter is accurately held constant by a separate controller. Extruder 7 temperature is also controlled independently.

The torque measuring device merely illustrates one method of measuring the tension in the torque arm. There are a variety of ways in which this could be done, for example by a strain gauge load cell, a pneumatic force balance load cell or a beam balance. The signalling device can be either air, electric, hydraulic or sound.

Figure 2:
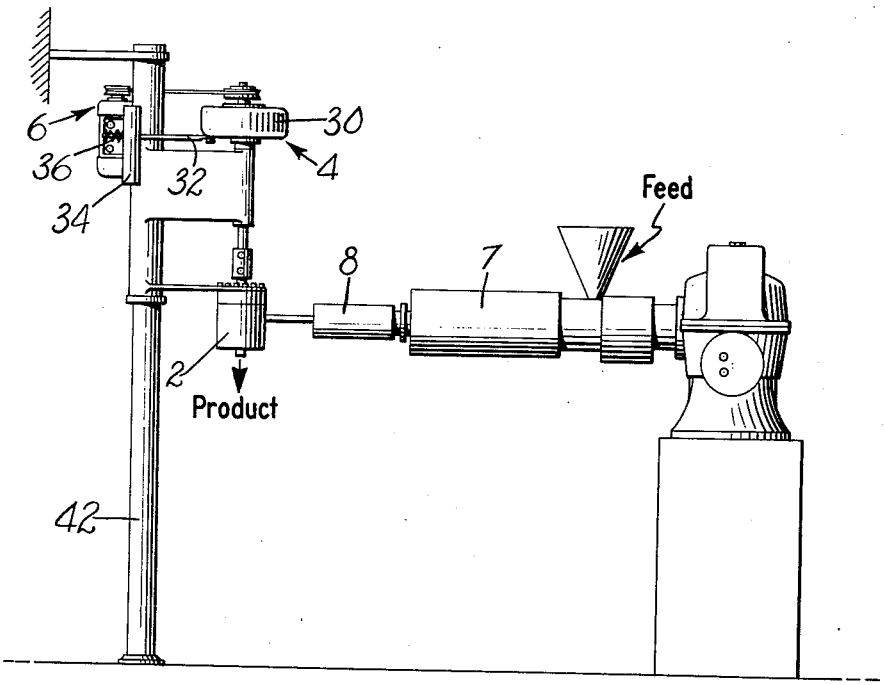
FIG. 2 is an elevational view of the viscosimeter connected to the discharge of a typical extruding and pyrolysis tube.

The supporting structure for the Disc Mill and drive equipment shown in FIGS. 2–4 is characterized by its simplicity and versatility. It consists of one tubular support column 42 carrying two sleeves, one above the other, one of which 46 supports the viscometer 2 and reducer while the other supports the motor 6. Location of the set-screw collar 44 on the support column determines the height of the equipment above the floor. Both sleeves are free to rotate with respect to column 42 to bring the Disc Mill into alignment with the pyrolysis tube or to swing it aside for servicing. The angular position of one sleeve with respect to the other controls belt tension and is established by a jack-screw not visible in the drawing. If a variable pitch sheave were used on the motor, this jack-screw would serve for speed adjustment, but it is not so used in this application. The top of the support column carries a bracket to a building column for steadying and supports a removable belt guard not shown.

The particular viscosimeter described herein is unique in that the rotor to wall clearances preferably do not exceed 0.030″, so that only a thin film of plastic material is being analyzed at any one instant and the residence time is of short duration, generally under thirty seconds, thus avoiding any material decomposition of the plastic. Moreover, with these clearances any thermal energy resulting from the rotation of the rotor is rapidly dissipated to the body of the viscosimeter and hence allows the viscosity of the polymer to be measured at a precise and controlled temperature. The material flow path is also quite unique in that it enters the viscosimeter cavity along the periphery of the disc, flows around the said periphery down around the sides of the disc and out through the ports in the disc itself. Thus the material undergoes a great deal of working per unit volume which in turn produces a device quite sensitive to small changes of viscosity.

FIGURE 7 shows the melt-index range covered by two springs of different stiffness or spring rate with all other parameters of the system held constant. It is obvious that with a lower rate spring (No. 1) less torque will be required to give full scale deflection of said spring and consequently of the control system. Hence a weaker spring is used with lower viscosities.

FIGURE 8 shows the record of an exemplary pyrolysis run showing the resultant melt-index control using the apparatus of the instant invention. As stated previously, more delicate control equipment would produce even more uniform results.

It is of course obvious that this invention applies only to those thermoplastic resins which are pyrolyzable within controlled limits and not to those, such as polyvinyl chloride, which completely deteriorate upon the application of any appreciable amount of heat.

While the instant invention has been described in detail with regard to the embodiment set forth in FIG. 1, it is to be understood that considerable variations could be made in the particular control elements employed and still be within the spirit and scope of the invention.

We claim:

1. A rotational viscosimeter which comprises a body portion having a cylindrical cavity therein and a shaftway passing through said body portion axially of said cylindrical cavity, a rotatable disc axially located within said cavity, a rotatable shaft fixedly connected to said disc extending out of the body portion on either side thereof and a bore within the shaft extending from one end thereof to a point at least within the disc, material inlet means radially disposed on the periphery of the cylindrical cavity, material outlet means which comprises a plurality of ports on either side of said disc extending from a point adjacent the shaft to said bore hole within one end of the shaft, means connected to the other end of the shaft for driving same at a constant speed, and means for measuring the torque necessary to drive said shaft.

2. The viscosimeter set forth in claim 1 above wherein the clearances between the cylindrical cavity and the rotatable disc do not exceed 0.03 inch.

3. A rotational viscosimeter which comprises a body portion having a cylindrical cavity therein and a shaftway passing through said body portion axially of said cylindrical cavity, a rotatable disc axially located within said cavity, a rotatable shaft fixedly connected to said disc extending out of the body portion on either side thereof and a bore within the shaft extending from one end thereof to a point at least within the disc, means for rotating said shaft, means for measuring the torque necessary to drive said shaft, material inlet means radially disposed on the periphery of the cylindrical cavity, material outlet means which comprises a plurality of ports on either side of said disc extending from a point adjacent the shaft to said bore hole within one end of the shaft and wherein the clearances between the cylindrical cavity and the rotatable disc do not exceed 0.03 inch.

References Cited in the file of this patent

UNITED STATES PATENTS

| | | |
|---|---|---|
| 1,534,091 | Smoot | Apr. 21, 1925 |
| 1,654,614 | Smith | Jan. 3, 1928 |
| 2,305,531 | Hurndall | Dec. 15, 1942 |
| 2,435,416 | Thomson et al. | Feb. 3, 1948 |